(12) United States Patent
Kamasuka

(10) Patent No.: US 8,854,658 B2
(45) Date of Patent: Oct. 7, 2014

(54) SELECTIVELY DISPLAYING PRINT JOB INFORMATION BASED ON IMAGE FORMING APPARATUS DISPLAY CAPABILITY

(75) Inventor: Atsushi Kamasuka, New Hyde Park, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 442 days.

(21) Appl. No.: 13/080,245

(22) Filed: Apr. 5, 2011

(65) Prior Publication Data

US 2011/0267647 A1    Nov. 3, 2011

(30) Foreign Application Priority Data

Apr. 28, 2010 (JP) ................. 2010-104237

(51) Int. Cl.
*G06F 3/12* (2006.01)
*G06Q 30/06* (2012.01)

(52) U.S. Cl.
CPC ...... *G06F 3/1288* (2013.01); *G06F 2206/1504* (2013.01); *G06Q 30/06* (2013.01); *G06F 3/1267* (2013.01); *G06F 3/1203* (2013.01)
USPC ....................................... 358/1.15

(58) Field of Classification Search
USPC ....................................... 358/1.15
See application file for complete search history.

(56) References Cited

U.S. PATENT DOCUMENTS

| | | | |
|---|---|---|---|
| 2004/0073873 A1* | 4/2004 | Croney et al. | 715/526 |
| 2005/0141022 A1* | 6/2005 | Aiyama | 358/1.15 |
| 2008/0174804 A1* | 7/2008 | Hsu et al. | 358/1.15 |
| 2009/0303525 A1* | 12/2009 | Yoshida | 358/1.15 |

FOREIGN PATENT DOCUMENTS

| | | | |
|---|---|---|---|
| JP | 2001-75751 A | 3/2001 | |
| JP | 2003-280869 A | 10/2003 | |

OTHER PUBLICATIONS

Machine translation of JP 2003-280869 to Jinbo.*

* cited by examiner

*Primary Examiner* — Eric A Rust
(74) *Attorney, Agent, or Firm* — Fitzpatrick, Cella, Harper & Scinto

(57) ABSTRACT

Upon reception of print jobs from a host, an application server holds the print jobs, saves a price list, and calculates the cost to output the print jobs based on the price list and the setting information of the received print jobs. The server transmits the cost information and print jobs to a print apparatus which outputs the print jobs. The print apparatus displays the received cost information on an operation unit to make a user determine whether to output the print jobs prior to output of the jobs.

9 Claims, 7 Drawing Sheets

FIG. 4

| | Job | Color | Format | Pages | Copies | Price |
|---|---|---|---|---|---|---|
| ☐ | Job A | B/W | A4 | 2 | 1 | 4.0 |
| ☐ | Job B | B/W | A4 | 1 | 1 | 2.0 |
| ☐ | Job C | B/W | A5 | 1 | 1 | 1.0 |

Queue
User : Administrator 401
411
412
413

Print + Delete | Delete | Select All | View Archive | Logout

421

SELECTIVELY DISPLAYING PRINT JOB INFORMATION BASED ON IMAGE FORMING APPARATUS DISPLAY CAPABILITY

BACKGROUND OF THE INVENTION

1. Field of the Invention

The present invention relates to an image forming apparatus which cooperates with, for example, an application server to display a cost for outputting jobs, an image forming system, and a control method therefor.

2. Description of the Related Art

In recent years, there has been an increasing demand for a function contributing to energy saving/cost reduction in an image forming apparatus such as a multi function peripheral (MFP). Thus, there is proposed, for example, a system in which a server calculates a cost for printing. There is also proposed a system in which jobs input from the PC terminal of a user are temporarily stored in a server and the user performs a predetermined operation through the operation unit of an image forming apparatus from which the user wants to print out, thereby acquiring the jobs stored in the server to print out. In this system, the server manages a price list, and has a function of calculating a cost necessary for outputting the temporarily stored jobs based on the setting information of the jobs. When the user instructs an output operation in the image forming apparatus, a screen provided by the image forming apparatus displays a cost necessary for outputting each job acquired from the server. For example, Japanese Patent Laid-Open No. 2003-280869 describes a system which presents a cost calculated by a server to the portable terminal of a user.

Furthermore, Japanese Patent Laid-Open No. 2001-075751 discloses a technique which attains a secure printout by holding user information and job information as a table within an image forming apparatus. Japanese Patent Laid-Open No. 2001-075751 also describes a network printer which previously registers information about the user such as a usage charge, and counts the number of printed materials in printing to record charge information.

These days, in terms of reduction of installation cost/maintenance cost, many customers (users) require a print system which operates in image forming apparatuses supplied by the same vendor from high to low price ranges and the same application environment.

To implement a function cooperating with the above-described server, however, only an expensive image forming apparatus whose operation unit (UI) has adequate levels of a display capability and operability to implement the function and which supports an open platform is available. A low-cost image forming apparatus whose operation unit has a display area formed by a one-line LCD desirably operates in the same application environment as the expensive image forming apparatus. It is, however, difficult to provide the low-cost image forming apparatus with the same function as that of the expensive image forming apparatus due to the restriction of a UI or system. Consequently, it is also difficult to implement, in the low-cost image forming apparatus, a function of providing the user with cost information necessary for acquiring jobs from the server to print them out.

SUMMARY OF THE INVENTION

The present invention has been made in consideration of the above conventional example, and provides a method which can present a cost for printing to a user when an image forming apparatus whose display capability is limited acquires and executes print jobs stored in a server.

The present invention comprises the following arrangement.

According to one aspect of the present invention, an image forming apparatus comprises: a connection unit, configured to control a connection with a server which stores print jobs; an operation unit, configured to display information and accept an input of information; a receiver, configured to transmit, to the server, a request for job information containing a total cost for executing all target print jobs, and receiving the job information in response to the request from the server; a controller, configured to display, on the operation unit, the total cost contained in the job information received by the receiver; and an execution unit, configured to transmit, when an agreement instruction about the total cost displayed on the operation unit is input through the operation unit, a request for the target print jobs to the server in response to the instruction, and controlling execution of the target print jobs received in response to the request.

According to another aspect of the present invention, a server apparatus comprises: a storage unit, configured to store print jobs received from an external apparatus; a storage unit, configured to store a price list showing a cost for executing a print job; a receiver unit, configured to receive a request for job information about the print jobs stored in the storage unit from an image forming apparatus including an operation unit configured to display information and accept an input of information; a creation unit, configured to refer to the price list in response to the request to create, in a format according to a display capability of the operation unit of the image forming apparatus, job information containing a total cost for executing all target print jobs to be printed in the image forming apparatus among the print jobs stored in the storage unit; a response unit, configured to respond to the image forming apparatus with the job information created by the creation unit; and a transmitter unit, configured to transmit the target print jobs to the image forming apparatus in response to a request for the target print jobs from the image forming apparatus.

According to the present invention, even in a system including an image forming apparatus whose display capability is low and which has a small amount of displayable information, it is possible to provide, through the image forming apparatus, the user with a cost for printing when the image forming apparatus acquires and executes print jobs stored in a server.

Further features of the present invention will become apparent from the following description of exemplary embodiments with reference to the attached drawings.

BRIEF DESCRIPTION OF THE DRAWINGS

FIG. 4 is a view showing a screen example which is used to select jobs to be output and is displayed on the operation screen of an MFP 101*b*;

FIG. 6 is a view showing an operation procedure example when obtaining printouts through the operation screen of the MFP 101a;

FIG. 7 is a view showing a job output confirmation screen example displayed on the operation screen of the MFP 101a;

FIG. 10 is a view showing a screen (with no job) example displayed on the operation screen of the MFP 101a.

DESCRIPTION OF THE EMBODIMENTS

<Hardware Configuration>

Figure 1:
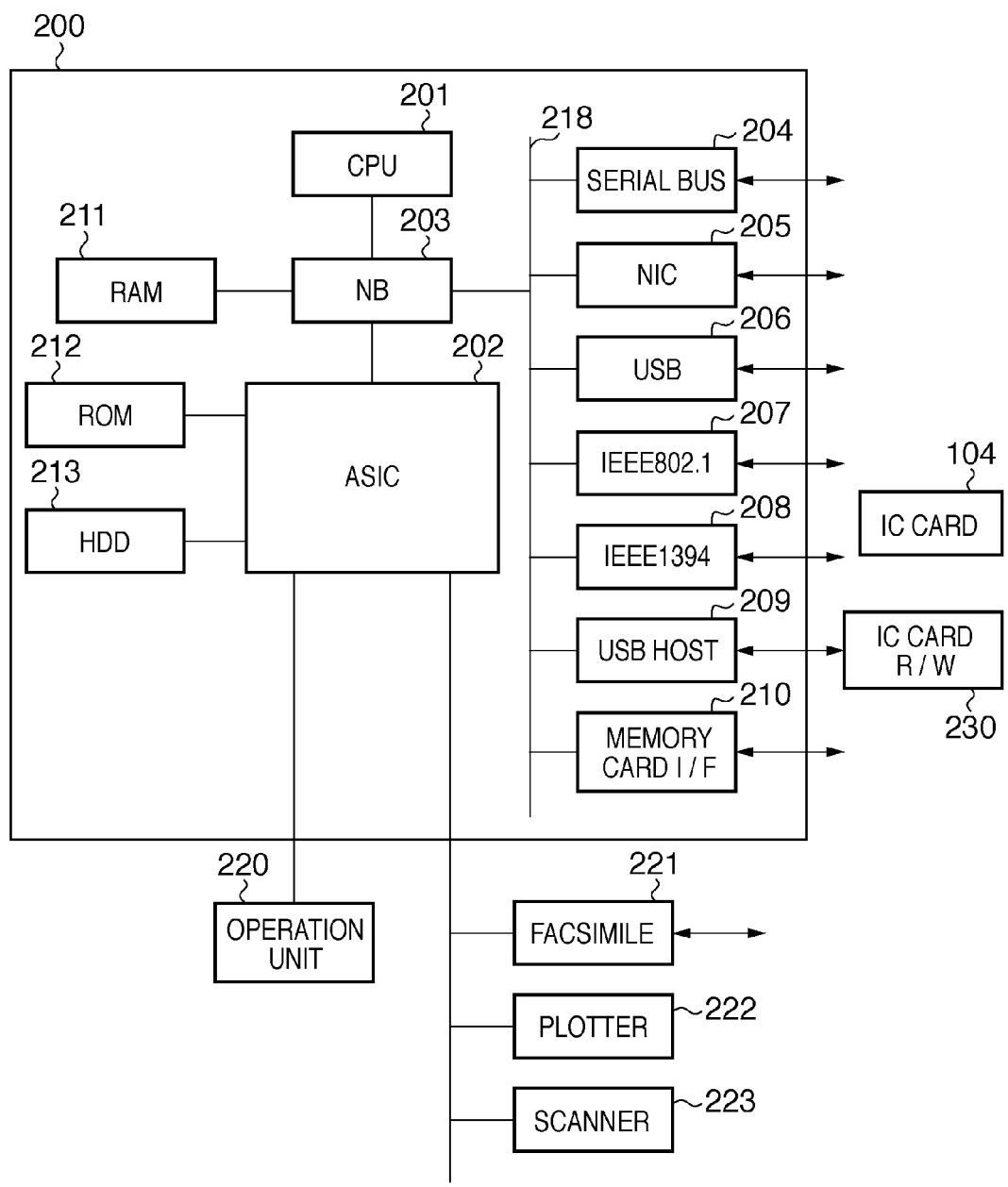
FIG. 1 is a block diagram showing the hardware configuration of an image forming apparatus according to an embodiment of the present invention.

An embodiment of the present invention will be described below with reference to the accompanying drawings. FIG. 1 is a block diagram showing the hardware configuration of an image forming apparatus according to the embodiment. MFPs 101a and 101b (to be described later) have basically the same configuration although there are differences in function of each hardware component and screen size of an operation unit. Each image forming apparatus includes a controller 200 with a CPU for performing comprehensive control, an operation unit 220 with an operation panel for setting processes and operations, a plotter 222 for image processing, and a scanner 223 for reading a document. The apparatus in FIG. 1 has a facsimile function, and thus also has a facsimile control unit 221 for performing facsimile control.

The controller 200 includes a CPU 201 for controlling the MFP as a whole, an ASIC 202 for a controller with an operation unit I/F, CPU I/F, PCI I/F, memory controller, and the like, an HDD 213 for accumulating image data, and an NB (North Bridge) 203 connected via a PCI bus 218. The controller 200 also includes a RAM 211 and a ROM 212. The NB 203 is connected with a serial bus 204, a network interface card (to be referred to as an NIC hereinafter) 205, a USB device 206, an IEEE802.11 wireless LAN I/F 207, an IEEE1394 I/F 208, a USB host 209 for connecting an IC card reader/writer 230 or the like via a USB cable, a memory card I/F 210, and the like.

The facsimile control unit 221, the plotter 222, the scanner 223, and other hardware resources are connected with the ASIC 202 via the PCI bus 218.

The CPU 201 is connected with the IC card reader/writer 230 by the USB cable via the NB 203, PCI bus 218, and USB host 209, and controls the IC card reader/writer 230 by transmitting commands to it. Access to an IC card 104 is attained when the IC card reader/writer 230 communicates with the IC card 104.

Figure 11:
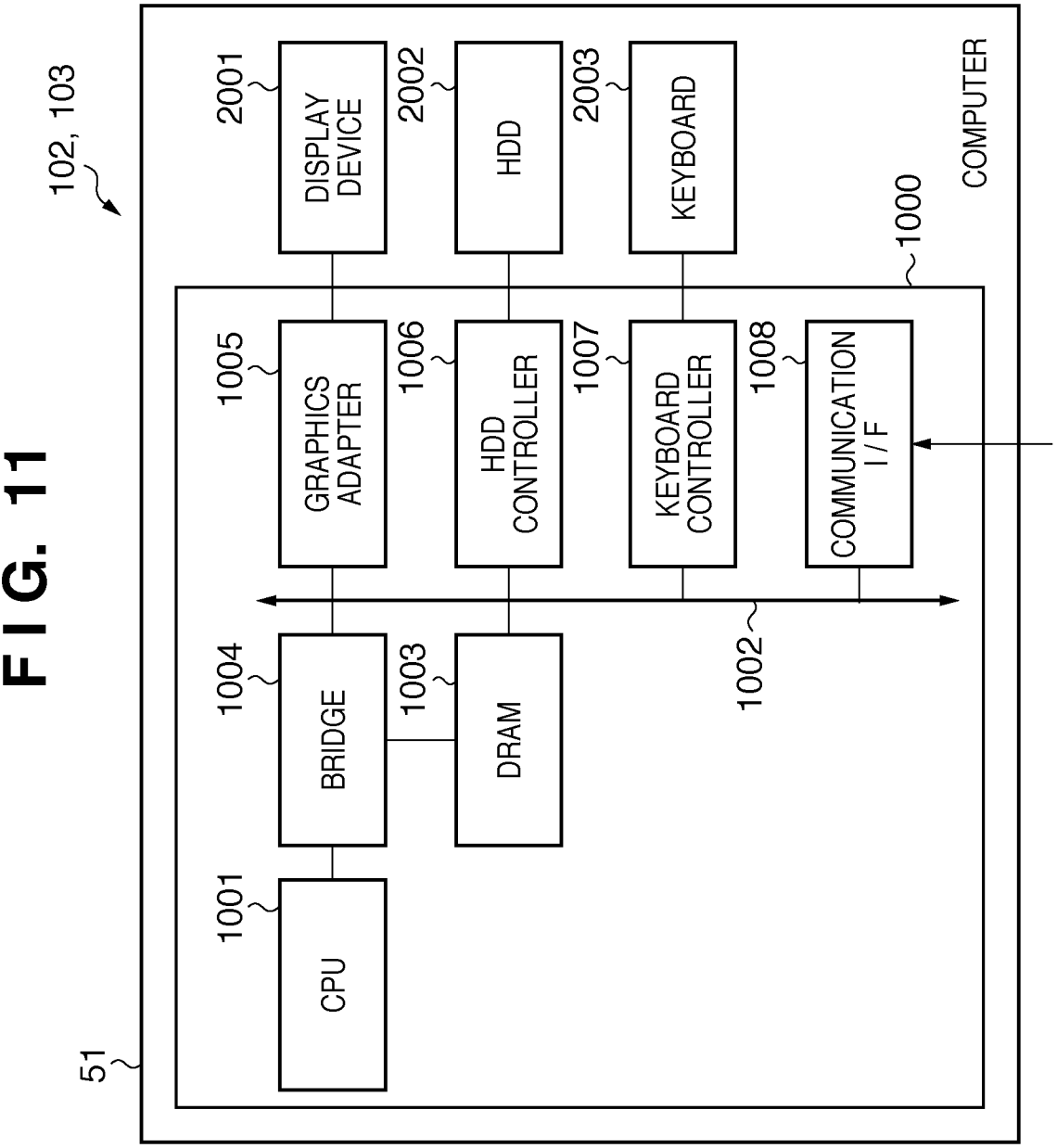
FIG. 11 is a block diagram showing the hardware configuration of a general-purpose computer such as a server according to the embodiment of the present invention.

FIG. 11 is a block diagram showing a general-purpose computer 51 which functions as a server or client. As shown in FIG. 11, the whole general-purpose computer 51 is formed by a processing unit 1000 and peripherals. The processing unit 1000 of the general-purpose computer 51 includes a CPU 1001 for executing a program, a bus 1002 for interconnecting system components, a DRAM 1003 for temporarily storing a program executed by the CPU 1001, data to be processed, and the like, and a bridge 1004 for connecting a system bus, a memory bus, and the CPU 1001. The processing unit 1000 also has an HDD controller 1006 responsible for interfacing with an HDD device 2002, a keyboard controller 1007 responsible for interfacing with a keyboard 2003, and a communication I/F 1008 with a network such as an NIC.

The processing unit 1000 further includes a graphics adapter 1005. The graphics adapter 1005 is connected with a display device 2001 for displaying graphics information or the like to an operator. The graphics adapter 1005 is also connected with the hard disk drive (HDD) device 2002 serving as a mass storage device storing programs and data, and the keyboard 2003 via the controllers, respectively.

Figure 2:
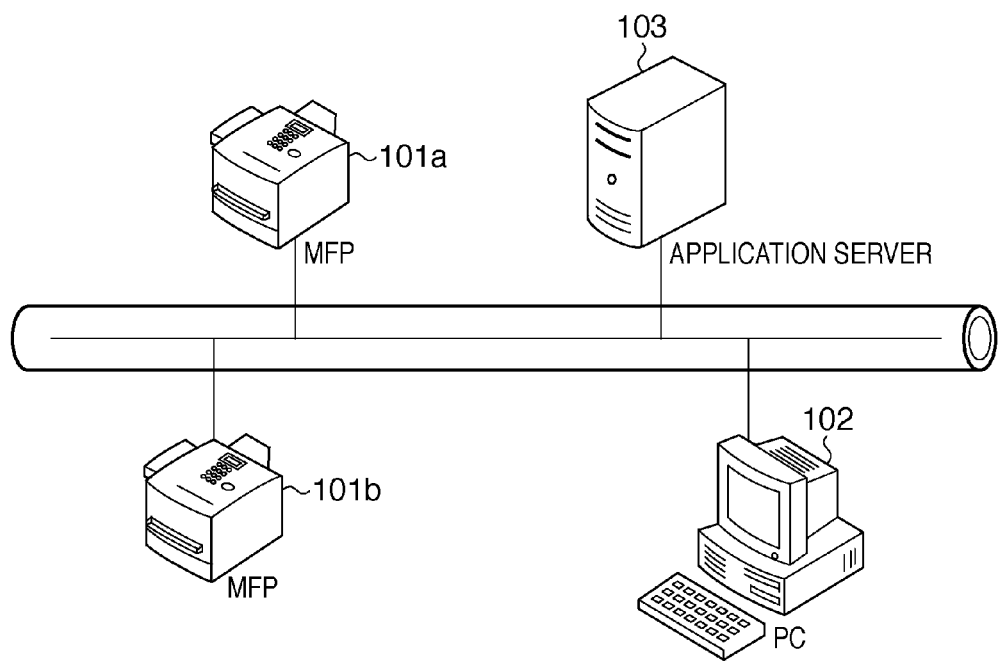
FIG. 2 is a view showing the configuration of a system in which the image forming apparatus according to the embodiment of the present invention is used.

FIG. 2 is a schematic view showing an image forming system including an information processing apparatus and the image forming apparatuses according to the embodiment. In this system, the plurality of image forming apparatuses (MFPs 101a and 101b), a PC terminal 102, and an application server 103 are communicably connected with each other via a network. In this embodiment, there are big differences in display area and contents between a screen (for example, FIG. 5 to be described later) displayed on the operation unit of the MFP 101a and that (for example, FIG. 4 to be described later) displayed on the operation unit of the MFP 101b. These screens are designed according to the selling prices of the MFPs or the like, and the MFP 101b is sold at a price higher than that of the MFP 101a.

<Outline of Service Workflow>

Figure 3:
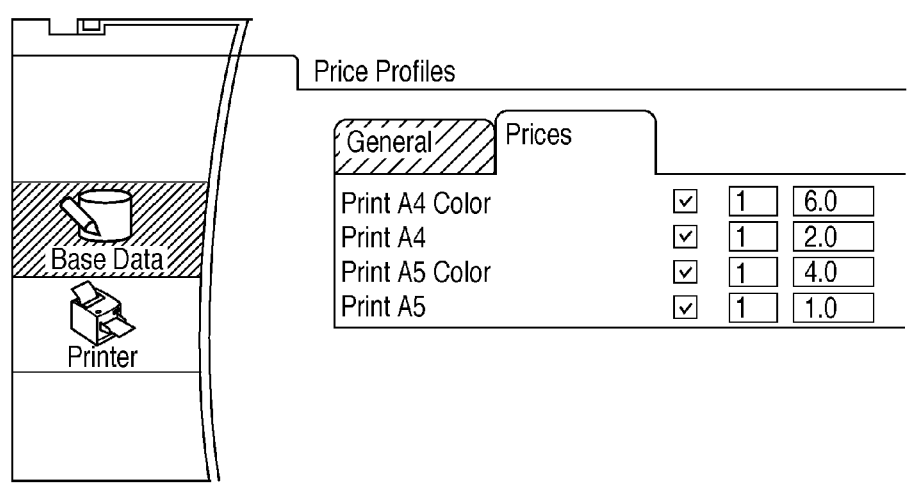
FIG. 3 is a view showing a cost setting screen example in an application server 103.

In this embodiment, a job output workflow as a service provided by the application server 103 is as follows. The user inputs a print job to the application server 103 from his/her PC terminal 102. The application server 103 temporarily stores the print job input from the external device in a predetermined storage device. At this time, the application server 103 stores, in association with the print job, the identification information of the user who has instructed the print job. On the other hand, the application server 103 provides a screen used to set prices for executing print jobs to print out documents and the like, as shown in FIG. 3. In FIG. 3, for example, unit prices are set as a price list, such as $2.00 per page for A4 monochrome printing, $6.00 per page for A4 color printing, and $1.00 per page for A5 monochrome printing. The application server 103 manages the set price list. Although dollar is used as a unit of currency in this example, the administrator of the application server 103 can support any unit of currency. The application server 103 can have a plurality of price lists, and use one of the price lists according to, for example, a corresponding user.

The user goes to an MFP from which he/she wants to output the print job, and inputs identification information (or an authentication key) through the IC card 104 or the operation unit. The input information undergoes authentication processing by the MFP or the application server 103 through communication. If the authentication processing succeeds, the user can use the MFP. For example, the operation unit of the MFP accepts an operation other than for authentication such as an operation for executing a print job.

<Display Example by MFP with High Display Capability>

If the operation unit 220 having a large-area display screen is used or the MFP 101b with a high display capability in a high price range which, for example, has a web browser function is used, a screen shown in FIG. 4 is displayed on the operation unit. The screen shown in FIG. 4 displays a job list 401 including three jobs which have been input to the application server 103 using a login user name "Administrator". The login user indicates a user who has been authenticated and logged in. The login user can select a desired print job through the screen, and issue an output instruction to the MFP 101b by a specific operation such as selection of a "Print+Delete" key 421. The selected print job is referred to as a target print job. The selected target print job is read out from the application server 103 to print out. The processing of the MFP 101*b* is to acquire the print job selected and instructed to be output by requesting it from the application server 103, and then execute the acquired print job to print out. The screen of FIG. 4 displays pieces of job information 411 to 413 of three print jobs input to the application server 103. More specifically, the job information contains a job name, color information, size, the number of pages, the number of copies, and a cost. In this example, the cost is determined based on the price list managed by the application server 103, and the color information, the size, the number of pages, and the number of copies of each print job, and then the determined cost is displayed.

A web browser installed in the MFP 101*b* may perform display of the MFP 101*b* based on information such as HTML data provided from the application server 103. In this case, an input instruction by the user or the like is sent via the web browser. The MFP 101*b* is required to have a display capability compliant to a client computer in order to display the HTML data provided by the server.

<Display Example by MFP with Low Display Capability>

Figure 5:
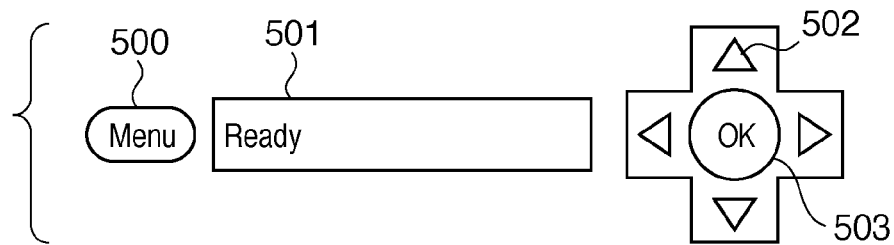
FIG. 5 is a view showing an operation screen example of an MFP 101*a*.

The MFP 101*a* in a low price range has, for example, the operation unit 220 as shown in FIG. 5. The operation unit 220 has only minimum components such as a Menu button 500, a display unit 501 for displaying a character string for one line, arrow keys 502, and an OK key 503. It is, therefore, difficult to make the user issue a print instruction with the same operation procedure as that of the MFP 101*b* as described above. Note that in this embodiment, such MFP with a small amount of displayable information is referred to as an MFP with a low display capability. The operation procedure of the operation unit of the MFP 101*a* when outputting a print job input to the application server 103 will now be explained using FIGS. 6 and 7. In this example, as described above, assume that the user with the login user name "Administrator" has logged in.

Figure 6:
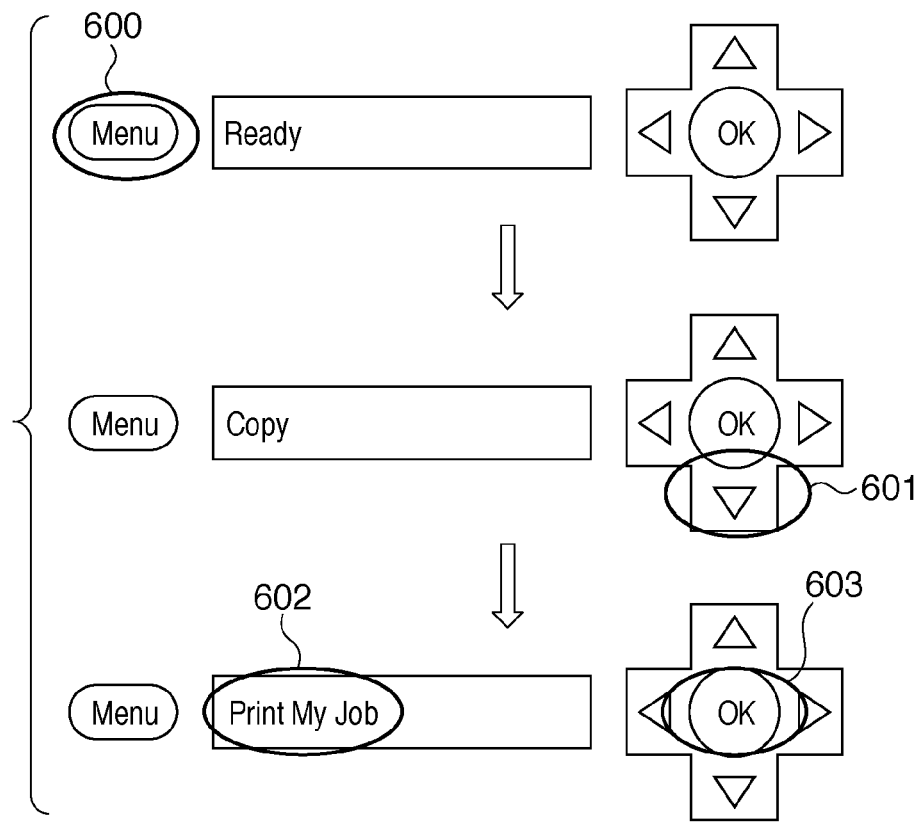

Referring to FIG. 6, the login user presses a Menu button 600. Then, the login user presses a down arrow key 601 to display "Print My Jobs" 602. After that, the login user presses an OK button 603. These user operations make it possible to issue a print instruction by considering, as target print jobs, all the print jobs of the login user which have been input to the application server 103 connected with the MFP 101*a* via a network. If one user registers a plurality of print jobs, for example, their job IDs may be sequentially displayed in accordance with the operation of the arrow key 601 after "Print My Jobs" 602 is displayed. In this embodiment, print jobs for each user are regarded as a unit of selection. If one user registers a plurality of print jobs, therefore, they are collectively selected.

Figure 7:
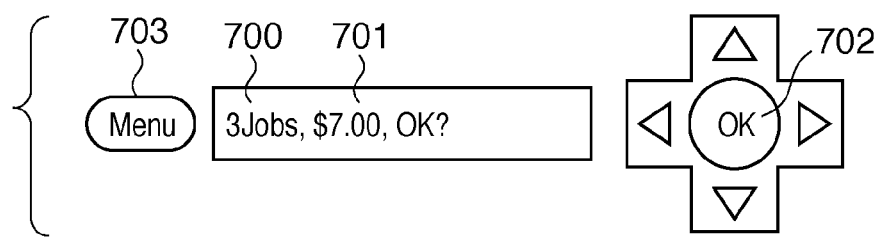

Upon determination of print jobs to be executed, the MFP 101*a* displays an output confirmation screen as shown in FIG. 7. This screen displays information received from the application server 103. More specifically, the screen displays a field 700 for the total number of jobs which the login user has input to the application server 103, and a total cost 701 necessary for outputting the jobs. In this example, the screen indicates that three print jobs (jobs A to C) owned by the user "Administrator" have been input to the application server 103, and $7.00 is necessary for outputting the jobs. If the user inputs an agreement instruction by pressing an OK button 702, all the jobs which the login user has input to the application server 103 are output. The user can cancel an output operation by pressing, for example, a Menu button 703. If the user cancels an output operation, he/she can access the application server 103 using his/her PC terminal 102 to delete the print jobs in a holding state or to input regenerated print jobs.

The confirmation screen of FIG. 7 allows the user to determine whether to perform an output operation after recognizing a job count and a necessary cost, although the user cannot confirm the details of jobs as shown in FIG. 4, prior to output of the print jobs.

Since a display method in an MFP varies depending on the display capability of the MFP, the application server 103 provides different job information according to the kind of image forming apparatus for which jobs are requested. For example, the application server 103 provides an image forming apparatus with a high display capability such as the MFP 101*b* with information for enabling to display a job list from which it is possible to grasp the detailed information about each job. This information is in, for example, a markup language format such as an HTML format. On the contrary, to provide an image forming apparatus with a low display capability such as the MFP 101*a* with minimum information necessary for the user, the application server 103 counts the number of jobs, and calculates a necessary cost.

<Processing Procedure by MFP and Server>

Figure 8:
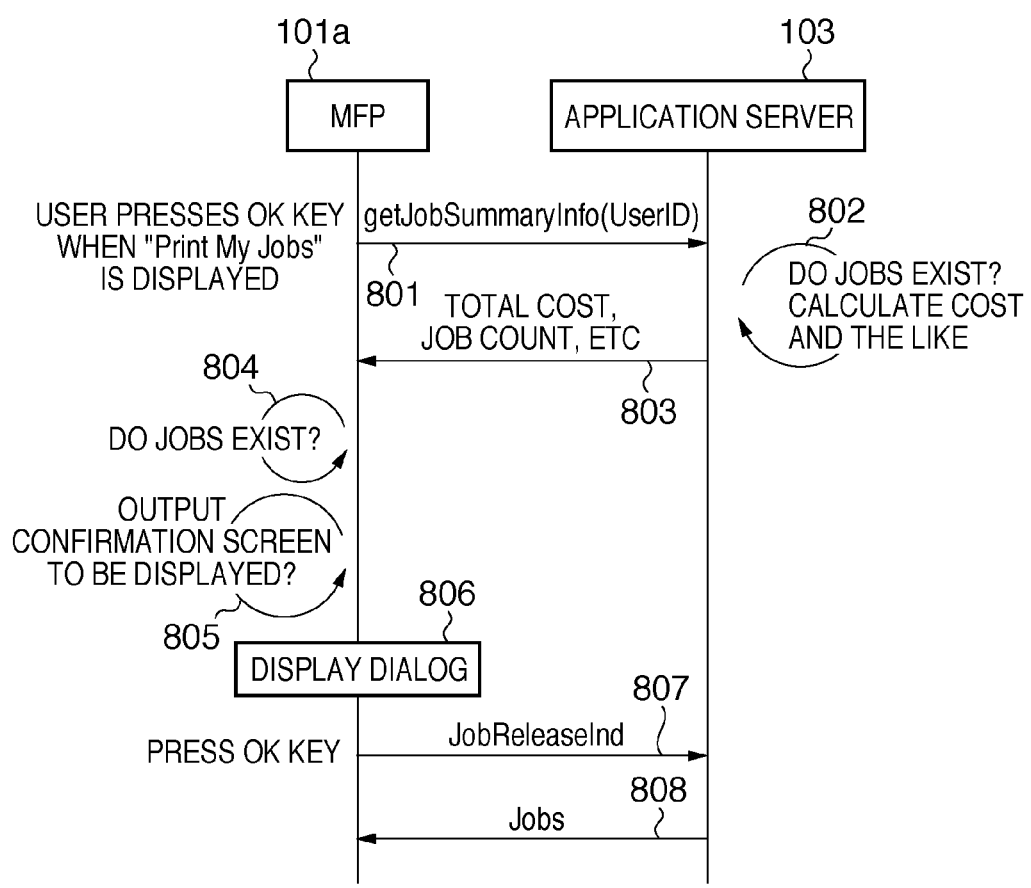
FIG. 8 is a sequence chart for explaining processing between the MFP and the application server 103 according to the embodiment.

FIG. 8 is a sequence chart showing a processing procedure executed between the MFP 101*a* and the application server 103 when the output confirmation screen exemplified in FIG. 6 is displayed. The MFP 101*a* accepts the user operation of the operation unit 220 performed according to the procedure of FIG. 6, and displays a menu item corresponding to the operation. When the user operation comes to the display of "Print My Jobs" 602 and then the OK button 603 is pressed, "Print My Jobs" is executed. At this time, the MFP 101*a* transmits, to the application server 103, an acquisition request (getJobSummaryInfo(UserID)) for the held job information of the login user using the user information (UserID) of the user as an argument (801).

Upon reception of the request, the application server 103 determines the presence/absence of print jobs of the user. If there are print jobs of the user, the application server 103 calculates a total cost for outputting the print jobs based on a predetermined price list and the settings (paper size, color/monochrome, and the like) of the print jobs (802). The application server 103 transmits, to the MFP 101*a*, calculated total cost information and information about the number of print jobs to be released (transmitted) (803).

The MFP 101*a* determines the presence/absence of print jobs of the user based on the information received in step 803 (804). At the same time, the MFP 101*a* determines the setting of whether to display the output confirmation screen (805), and displays an appropriate screen on the operation unit 220 according to the condition (806). In this embodiment, assume that the setting of whether to display the output confirmation screen is "display".

Figure 10:
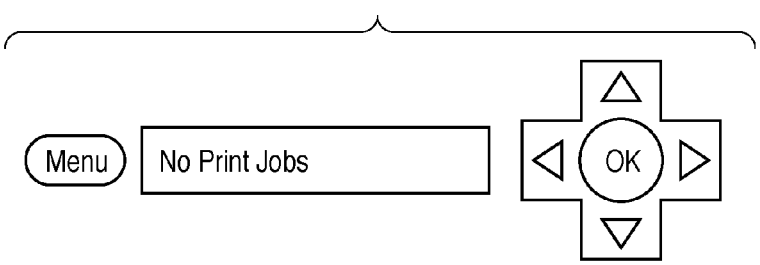

If, for example, there are three print jobs for the user and a total cost for outputting them is $7.00, the screen shown in FIG. 7 is displayed. Alternatively, if there is no job for the user in the server, a screen shown in FIG. 10 is displayed to indicate that there is no print job to be output.

After that, if the user presses the OK button 702 on the operation unit 220, the MFP 101*a* transmits a job release request (JobReleaseInd) to the application server 103 (807). Upon reception of the request, the application server 103 transmits the print jobs held in itself to the MFP 101*a* (808). Note that by storing the IDs or owner of the print jobs specified in step 802 in response to the held job information acquisition request, it is possible to specify the print jobs to be transmitted. If the job release request is received in step 807, the print jobs with the IDs or owner stored in step 802 are the targets of the release request.

As described above, the application server 103 passes, to each MFP (image forming apparatus), information according to the display capability of the MFP by returning a response to the request from the MFP. In the above-mentioned embodiment, the display capability of an MFP is determined to be high or low based on a protocol used by the MFP. That is, the application server 103 transmits detailed job information described in the HTML to an MFP which has requested job information by an HTTP (HyperText Transfer Protocol) request. On the other hand, the application server 103 transmits brief job information to an MFP which has requested job information by FTP, a proprietary protocol, or the like instead of HTTP. The brief job information is formed by, for example, only text, and has a limited number of letters (for example, up to the number of letters displayable on a display unit). If, for example, a back end process program for processing a request input through a protocol is prepared for each protocol, determination of the display capability based on the protocol is unnecessary. This is because it is only necessary to program a code for each protocol in consideration of the display capability of the MFP. If, however, the back end process program is common to protocols, it is necessary to determine the protocol of a request source, and create job information according to the determination result. This processing is executed in step 802 of FIG. 8.

It is desirable for the application server 103 to acquire information (for example, model information) about the display capability of an MFP in advance. In this example, assume that the vendor of the MFP is the same as that of an application. It is, therefore, easy to acquire such information. For example, it is only necessary to program the application to create information according to the lowest display capability among those of MFPs manufactured in the past and a current MFP.

If an MFP with a high capability and that with a low capability use the same protocol to communicate with the application server 103, the application server 103 needs to determine the display capability of each MFP based on the information other than protocol information. In this case, for example, the application server 103 acquires information about the model number of an MFP and the like using SNMP when connecting with the MFP. Based on the acquired information, reference is made to a correspondence table between model numbers and display capabilities prepared in advance in the application server 103 to specify the display capability of the MFP as the request source of job information. This may be simple discrimination between "high" and "low". According to the specified display capability, the application server 103 transmits the job information shown in FIG. 7 to the MFP with a low display capability, and that shown in FIG. 4 to the MFP with a high display capability.

<Procedure of Displaying Job Information by MFP>

Figure 9:
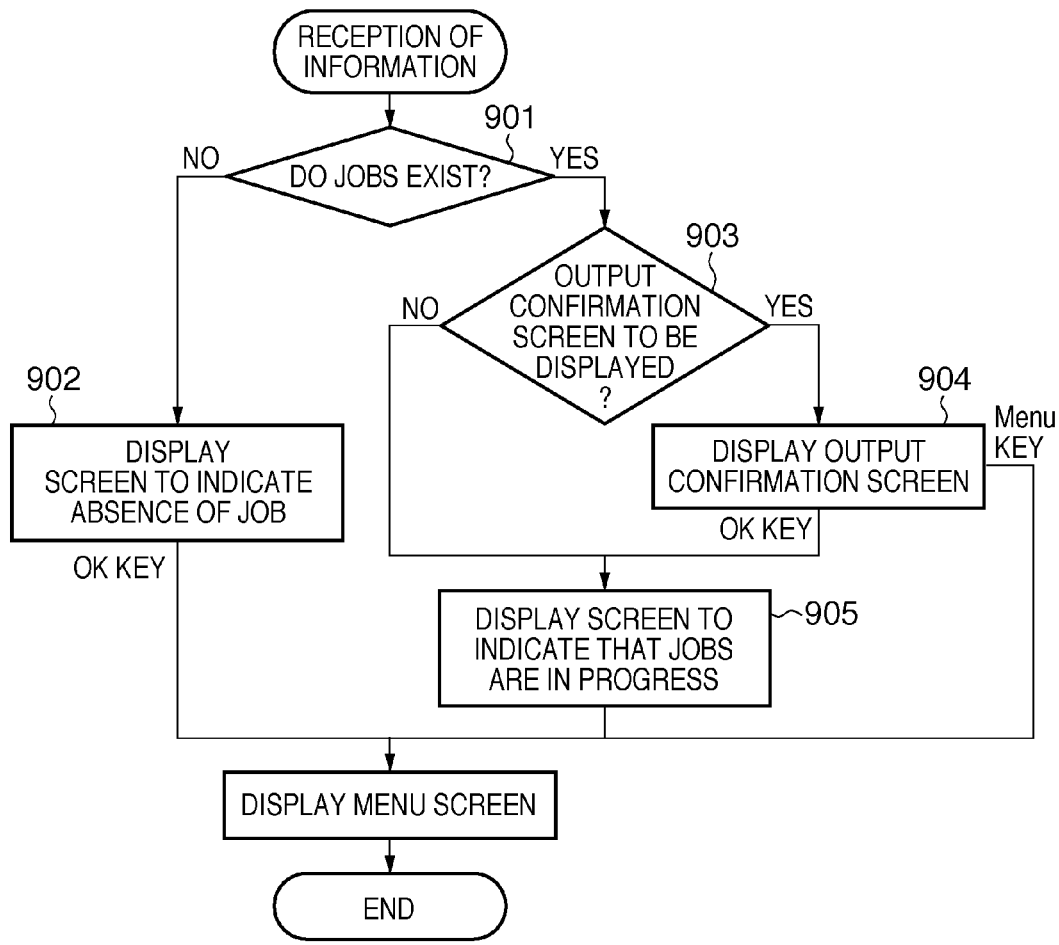
FIG. 9 is a flowchart illustrating a processing procedure when the MFP 101a displays the output confirmation screen.

FIG. 9 is a flowchart illustrating the processing of the MFP 101a when displaying the above-described output confirmation screen. Upon reception of the job information from the application server 103 in step 803 of FIG. 8, the CPU 201 of the MFP 101a refers to the job information to determine whether there exist print jobs of the user (901). If there is no print job for the user in the application server 103, the CPU 201 creates a screen as shown in FIG. 10, and displays it on the operation unit 220 (902). If there are print jobs of the user in the application server 103, the CPU 201 determines the setting of whether to display an output confirmation screen (903). This setting value is held in, for example, the ROM 212 or HDD 213 of the MFP 101a, and the CPU 201 refers to it.

If the setting value indicates that an output confirmation screen is displayed, the CPU 201 extracts a job count, a total cost, and the like from the job information received from the application server 103 to create a confirmation screen, and controls to display the screen on the operation unit 220 (904).

Alternatively, it is also possible to make a setting not to display a confirmation screen so as to cope with the user who wants to reduce the number of operation steps or who does not need a confirmation screen. In this case, a screen (not shown) indicating that the print jobs are in progress is displayed (905).

For the processing of the MFP 101a, it is easy to output the information passed from the application server 103 without formatting it. In this example, therefore, the application server 103 may transmit cost information containing information about a unit of currency. For example, the application server 103 transmits, to the MFP 101a, information as job information, in which the job count 700 and the cost 701 that are displayed in FIG. 7 are described by a character string as displayed. This offers an advantage that the MFP need not hold a table for managing currency information in the ROM 212 within the MFP or the like.

The authentication processing will not be mentioned. The MFP 101a or 101b can be connected with the IC card reader/writer 230 communicable with the IC card 104. A system administrator delivers, in advance, to the user the IC card 104 which records his/her individual authentication information. When the operation unit of the MFP 101a or 101b displays an authentication screen to require the user to perform authentication operation, the user holds the IC card 104 over the IC card reader/writer 230. This causes the apparatus 101a or 101b to execute authentication processing by communicating with the application server 103. Only when the authentication processing succeeds, the user can use the MFP 101a or 101b. Generally, there are two types of IC cards, that is, a contact type and non-contact type. The IC card 104 may be either of them. Furthermore, the individual authentication means for the user is not necessarily the IC card 104, and an ID, a password, and a combination of them for enabling identification of the user may also be possible. In this case, the user performs the authentication operation by inputting, through the operation unit of the MFP 101a or 101b, his/her own ID and password assigned by the system administrator in advance. The application server 103 or another authentication server may handle actual authentication processing. In some cases, the MFP 101a or 101b itself has an authentication table, and performs the authentication processing.

Although a job count and a cost are selected as information to be displayed in this embodiment, other information may be selected. For example, only a cost may be displayed. This can further reduce an amount of information to be displayed.

According to this embodiment, with the above-described procedure, it is possible to display information such as a job cost of which the user needs to be informed prior to execution of jobs even when an MFP whose amount of displayable information is limited is used as an output terminal of a workflow. Furthermore, even in a system including an MFP with a high display capability and that with a low display capability, a server can transmit job information according to the display capability of each MFP.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-104237, filed Apr. 28, 2010 which is hereby incorporated by reference herein in its entirety.

What is claimed is:

1. A server apparatus comprising:
a first storage unit, configured to store print jobs received from an external apparatus;
a second storage unit, configured to store a price list showing a cost for executing a print job;
a receiver unit, configured to receive a request for job information about the print jobs stored in said first storage unit from an image forming apparatus, the image forming apparatus including an operation unit configured to display information and accept an input of information;
a provision unit, configured to determine a display capability of the operation unit of the image forming apparatus based on a type of a protocol by which the request has been transmitted, refer to the price list stored in the second storage unit in response to the request, and provide information to the image forming apparatus for enabling the operation unit to display job information and price information of each of input jobs by job units if it is determined that the display capability of the operation unit is a high level, and to provide information to the image forming apparatus about the number of input jobs and information of total price required for outputting the jobs without providing the job information and price information of each of input jobs if it is determined that the display capability of the operation unit is a low level; and
a transmitter unit, configured to transmit target print jobs to the image forming apparatus in response to a request for the target print jobs from the image forming apparatus to which the information is provided by the provision unit.

2. The apparatus according to claim 1, wherein said provision unit creates, in a markup language format, job information for enabling to confirm a cost for executing each target print job via a web browser through the operation unit of the image forming apparatus when said receiver unit receives a request using HTTP from the image forming apparatus.

3. An image forming system in which a server and an image forming apparatus are connected, wherein the image forming apparatus has an operation unit to display information and accept an input of information, and wherein
said server comprises:
a first storage unit, configured to store print jobs;
a second storage unit configured to store a price list showing a cost for executing a print job;
a receiver, configured to receive a request for job information about the print jobs stored in said first storage unit from an image forming apparatus;
a provision unit, configured to determine a display capability of the operation unit of the image forming apparatus based on a type of a protocol by which the request has been transmitted, refer to the price list stored in the second storage unit in response to the request, and provide information to the image forming apparatus for enabling the operation unit to display job information and price information of each of input jobs by job units if it is determined that the display capability of the operation unit is a high level, and to provide information to the image forming apparatus about the number of input jobs and information of total price required for outputting the jobs without providing the job information and price information of each of input jobs if it is determined that the display capability of the operation unit is a low level; and
a transmitter unit, configured to transmit target print jobs to the image forming apparatus in response to a request for the target print jobs from the image forming apparatus to which the information is provided by the provision unit, and
wherein said image forming apparatus comprises:
a connection unit, configured to control a connection with said server;
the operation unit, configured to display information and accept an input of information;
a job information reception unit, configured to transmit to said server the request for the job information containing a total cost for executing all target print jobs by a protocol of a predetermined type, and receive the job information in response to the request from the server, wherein the job information has been created by the server in a format in accordance with the determined display capability of the operation unit which has been determined based on the type of the protocol;
a controller configured to display, on said operation unit, a total cost contained in the job information received by said job information reception unit, wherein both the job information and an operation key for selecting a job from among the job information are displayed in a display area on the operation unit in a case where the operation unit has a high level display capability based on the protocol of the predetermined type, or the job information is displayed in the display area on the operation unit and a job is selected from among the displayed job information by an operation key with which the operation unit is equipped in a case where the operation unit has a low level display capability based on the protocol of the predetermined type; and
an execution unit, configured to transmit, when an agreement instruction about the total cost displayed on said operation unit is input through said operation unit, a request for the target print jobs to said server in response to the agreement instruction, and control execution of the target print jobs received in response to the request.

4. The system according to claim 3, wherein said provision unit creates, in a markup language format, job information for enabling to confirm a cost for executing each target print job via a web browser through said operation unit of the image forming apparatus when said receiver receives a request using HTTP from the image forming apparatus.

5. The system according to claim 3,
wherein the job information further contains the number of target print jobs, and
said controller further displays the number of target print jobs on said operation unit.

6. The system according to claim 3, wherein the image forming apparatus further comprises:

an authentication unit, configured to authenticate a user in response to an input of authentication information by the user, wherein said receiver receives a request for job information about print jobs which have been created, as target print jobs, by the user authenticated by said authentication unit, and transmits the job information in response to the request.

7. The system according to claim 3, wherein the job information is represented by a character string if it is determined that the operation unit has a low level display capability based on the protocol of the predetermined type.

8. A non-transitory computer-readable storage medium which stores computer executable code of a program for causing a computer to execute a method by a server, said method comprising:

storing in a first storage unit print jobs received from an external apparatus;

storing in a second storage unit a price list showing a cost for executing a print job;

receiving by a receiver unit a request for job information about the print jobs stored in the first storage unit from an image forming apparatus, the image forming apparatus including an operation unit configured to display information and accept an input of information;

determining, by a provision unit, a display capability of the operation unit based on a type of a protocol by which the request has been transmitted, referring to the price list stored in the second storage unit in response to the request, and providing information to the image forming apparatus for enabling the operation unit to display job information and price information of each of input jobs by job units it if is determined that the display capability of the operation unit is a high level, and providing information about the number of input jobs and information of total price required for outputting the jobs without providing the job information and price information of each of input jobs if it is determined that the display capability of the operation unit is a low level; and transmitting, by a transmitter, target print jobs to the image forming apparatus in response to a request for the target print jobs from the image forming apparatus to which the information is provided by the provision unit.

9. A control method executed by an image forming system in which a server and an image forming apparatus are connected, wherein the image forming apparatus includes an operation unit configured to display information and accept an input of information, the method comprising:

the server performing:

a storage step of causing the server to store print jobs in a first storage unit;

a storage step of causing the server to store a price list showing a cost for executing a print job in a second storage unit;

a reception step of causing the server to receive a request for job information about the print jobs stored in the server from the image forming apparatus;

a providing step of causing the server to determine a display capability of the operation unit of the image forming apparatus based on a type of a protocol by which the request has been transmitted, referring to the price list stored in the second storage unit in response to the request, and providing information to the image forming apparatus for enabling the operation unit to display job information and price information of each of input jobs by job units if it is determined that the display capability of the operation unit is a high level, and providing information about the number of input jobs and information of total price required for outputting the jobs without providing the job information and price information of each of input jobs if it is determined that the display capability of the operation unit is a low level; and a transmission step of causing the server to transmit target print jobs to the image forming apparatus in response to a request for the target print jobs from the image forming apparatus to which the information is provided by the providing step; and the image forming apparatus performing:

a connection step of controlling a connection with the server;

a job information reception step of transmitting to said server the request for the job information containing a total cost for executing all target print jobs by a protocol of a predetermined type, and receiving the job information in response to the request from the server, wherein the job information has been created by the server in a format in accordance with the determined display capability of the operation unit which has been determined based on the type of the protocol;

a control step of displaying, on the operation unit, a total cost contained in the received job information, wherein both the job information and an operation key for selecting a job from among the job information are displayed in a display area on the operation unit in a case where the operation unit has a high level display capability based on the protocol of the predetermined type, or the job information is displayed in the display area on the operation unit and a job is selected from among the displayed job information by an operation key with which the operation unit is equipped in a case where the operation unit has a low level display capability based on the protocol of the predetermined type; and an execution step of transmitting, when an agreement instruction about the total cost displayed on the operation unit is input through the operation unit, the request for the target print jobs to the server in response to the instruction, and controlling execution of the target print jobs received in response to the request from the server.

* * * * *